(12) United States Patent
Olsen et al.

(10) Patent No.: US 10,068,370 B2
(45) Date of Patent: Sep. 4, 2018

(54) RENDER-TIME LINKING OF SHADERS

(71) Applicant: Microsoft Technology Licensing, LLC, Redmond, WA (US)

(72) Inventors: Luke Olsen, Redmond, WA (US); Jeff Bloomfield, Redmond, WA (US); Simon Tao, Kirkland, WA (US); Stephen Proteau, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/485,323

(22) Filed: Sep. 12, 2014

(65) Prior Publication Data

US 2016/0078671 A1   Mar. 17, 2016

(51) Int. Cl.
| | |
|---|---|
| *G06T 15/80* | (2011.01) |
| *G06T 3/00* | (2006.01) |
| *G06T 1/20* | (2006.01) |
| *G06F 9/445* | (2018.01) |
| *G06F 9/455* | (2018.01) |

(52) U.S. Cl.
CPC .......... *G06T 15/80* (2013.01); *G06F 9/44521* (2013.01); *G06F 9/45516* (2013.01); *G06T 1/20* (2013.01); *G06T 3/00* (2013.01)

(58) Field of Classification Search
None
See application file for complete search history.

(56) References Cited

U.S. PATENT DOCUMENTS

| | | | |
|---|---|---|---|
| 7,426,724 B2 | 9/2008 | Kilgard et al. | |
| 7,463,259 B1 | 12/2008 | Kolb et al. | |
| 7,750,913 B1 | 7/2010 | Parenteau et al. | |
| 8,289,325 B2 | 10/2012 | Green et al. | |
| 2006/0005178 A1* | 1/2006 | Kilgard | G06F 8/443 717/153 |
| 2007/0214097 A1* | 9/2007 | Parsons | G06F 17/30864 706/12 |
| 2008/0012874 A1 | 1/2008 | Spangler et al. | |
| 2010/0328325 A1 | 12/2010 | Sévigny et al. | |
| 2012/0306877 A1 | 12/2012 | Rosasco | |
| 2014/0043333 A1 | 2/2014 | Narayanan et al. | |
| 2014/0376655 A1* | 12/2014 | Ruan | H04L 1/06 375/267 |

OTHER PUBLICATIONS

"Using Shader Linking", Retrieved at: «http://msdn.microsoft.com/en-us/library/windows/desktop/dn466359(v=vs.85).aspx», Dec. 7, 2013, 1 page.

(Continued)

*Primary Examiner* — Michelle Chin
(74) *Attorney, Agent, or Firm* — Arent Fox LLP

(57) ABSTRACT

In one example, a graphics rendering subsystem may selectively link a set of graphic effect modules, such as shaders, to increase processing efficiency. The graphics rendering subsystem may execute a comparison of a performance attribute of a first pre-compiled graphic effect module with a linking criteria. The graphics rendering subsystem may link the first pre-compiled graphic effect module and a second pre-compiled graphic effect module at render-time in response to the performance attribute satisfying the linking criteria.

18 Claims, 13 Drawing Sheets

(56) References Cited

OTHER PUBLICATIONS

Svilpa, Robert, "OpenGL ES 3.0 Precompiled Shaders", Retrieved at: «https://software.intel.com/en-us/articles/opengl-es-30-precompiled-shaders», May 29, 2014, 3 pages.
Astle, Dave, "Binary Shaders", Retrieved at: «https://developer.qualcomm.com/blog/binary-shaders», Aug. 5, 2010, 11 pages.
"Best Practices for Shaders", Retrieved at:«https://developer.apple.com/library/ios/documentation/3ddrawing/conceptual/opengles_programmingguide/BestPracticesforShaders/BestPracticesforShaders.html», Jun. 4, 2014, 8 pages.
"Custom Effects", Retrieved at: «http://msdn.microsoft.com/en-us/library/windows/desktop/jj710194(v=vs.85).aspx», Nov. 16, 2012, 22 pages.
"About Core Image", Retrieved at: «https://developer.apple.com/library/ios/documentation/GraphicsImaging/Conceptual/CoreImaging/ci_intro/ci_intro.html»Retrieved on: Aug. 16, 2014, 7 pages.
Tehver, Mark, "Design and Applications of a Real-Time Shading System", In Master's Thesis, Aug. 12, 2014, 106 pages.
"International Search Report & Written Opinion Issued in PCT Patent Application No. PCT/US2015/049542", dated Nov. 23, 2015, 14 Pages.
"Second Written Opinion Issued in PCT Application No. PCT/US2015/049542", dated Aug. 4, 2016, 6 Pages.
"International Preliminary Report on Patentability Issued in PCT Application No. PCT/US2015/049542", dated Nov. 22, 2016, 8 Pages.

\* cited by examiner

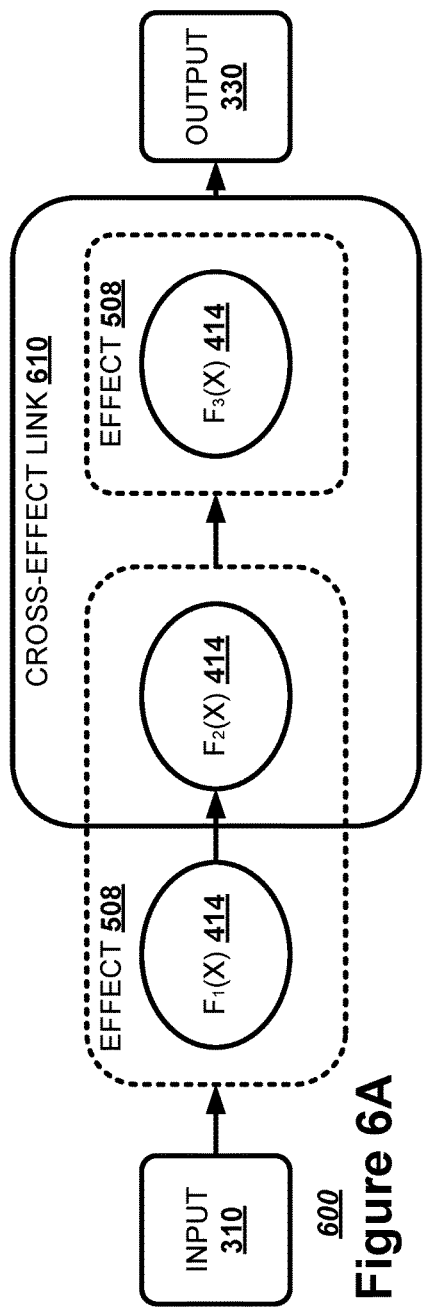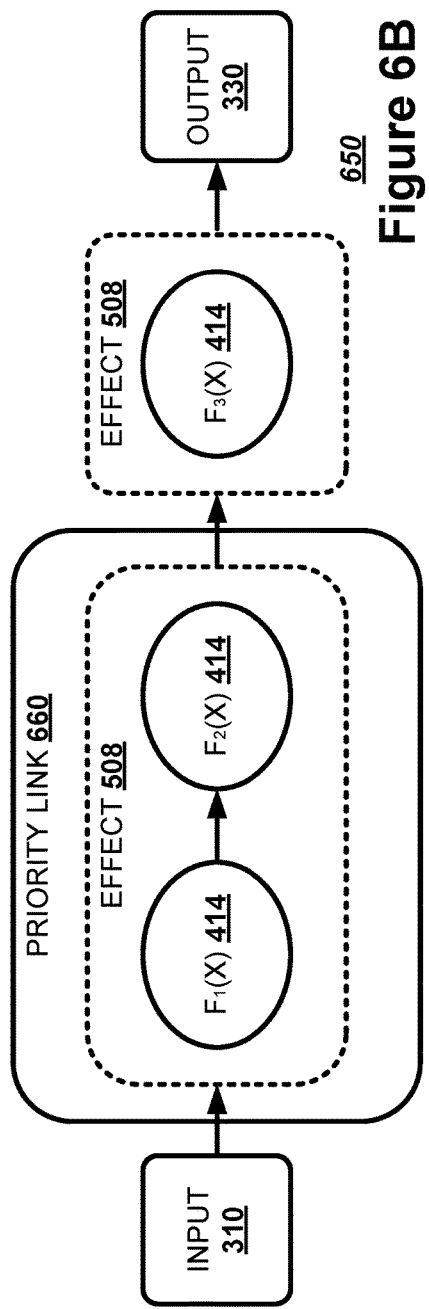

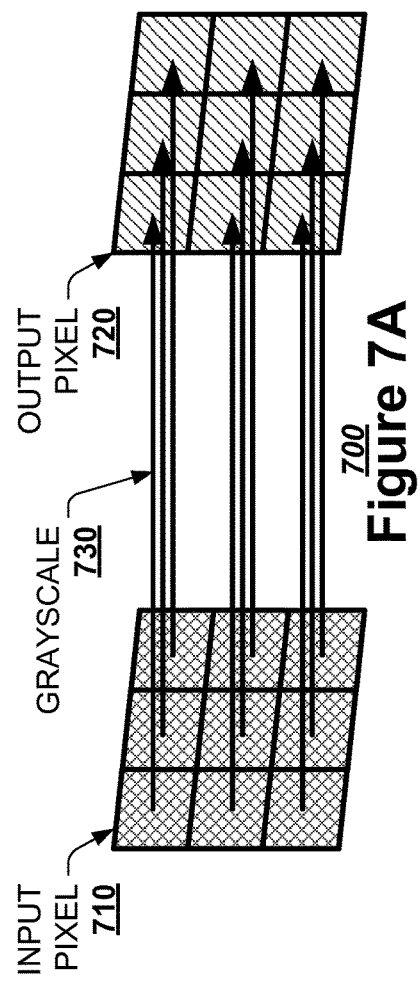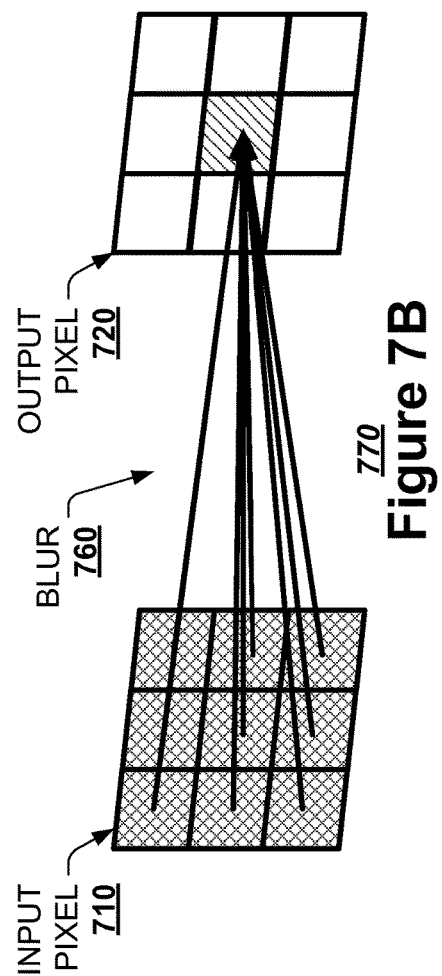

900

950

RENDER-TIME LINKING OF SHADERS

BACKGROUND

A software application may apply a combination of multiple bitmap effects onto image content. A photo editing application may adjust the brightness, remove redeye, or apply a vignette to a photo. The application may use a graphics processing unit to perform a set of graphics effects on a graphic data set. A graphic data set may be a digital image, a bitmap, a digital video, or other visual data. The graphics processing unit may apply each operation in order on the original image.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Examples discussed below relate to a graphics rendering subsystem selectively linking a set of graphic effect modules, such as shaders, to increase processing efficiency or accuracy. The graphics rendering subsystem may execute a comparison of a performance attribute of a first pre-compiled graphic effect module with a linking criteria. The graphics rendering subsystem may link the first pre-compiled graphic effect module and a second pre-compiled graphic effect module at render-time in response to the performance attribute satisfying the linking criteria.

DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

FIGS. 6a-b illustrate, in block diagrams, exemplary function linking.

FIGS. 7a-b illustrate, in block diagrams, exemplary sampling patterns.

Figure 8:
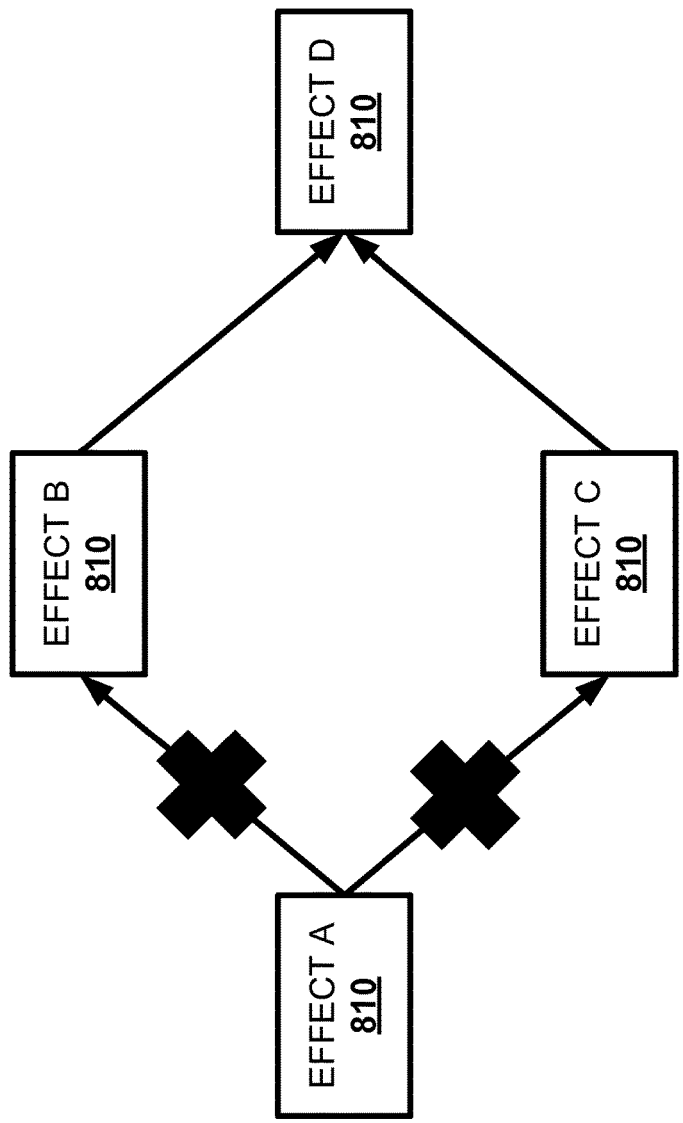

FIG. 8 illustrates, in a block diagram, an exemplary graph topology.

Figure 9A:
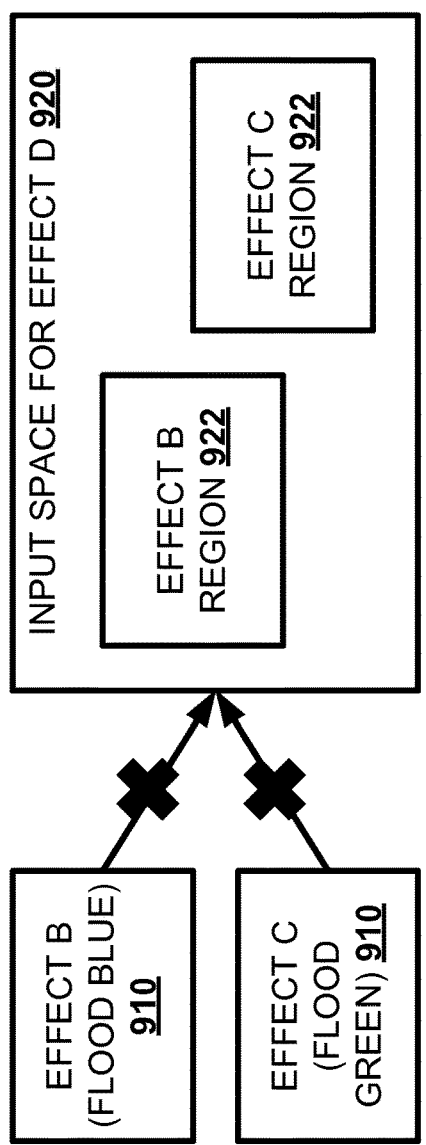
Figure 9B:
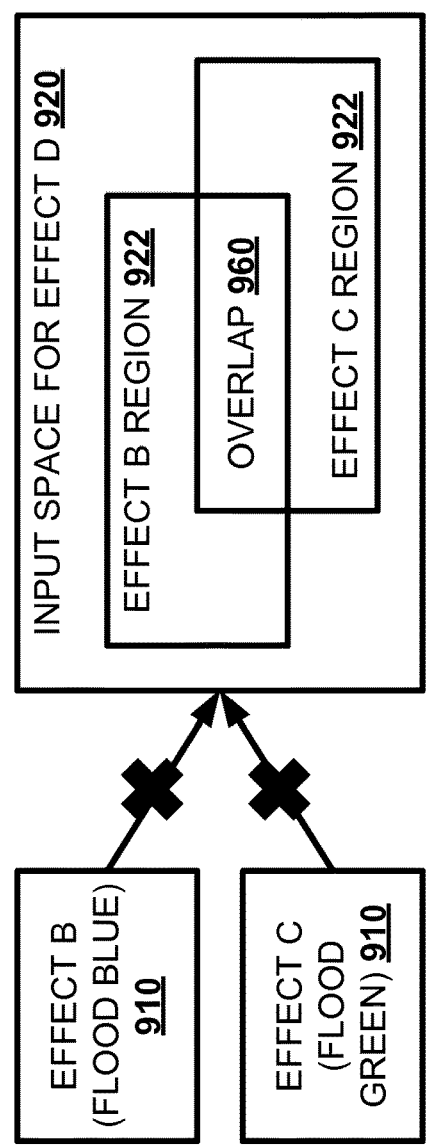

FIGS. 9a-b illustrate, in block diagrams, exemplary output mappings.

Figure 10:
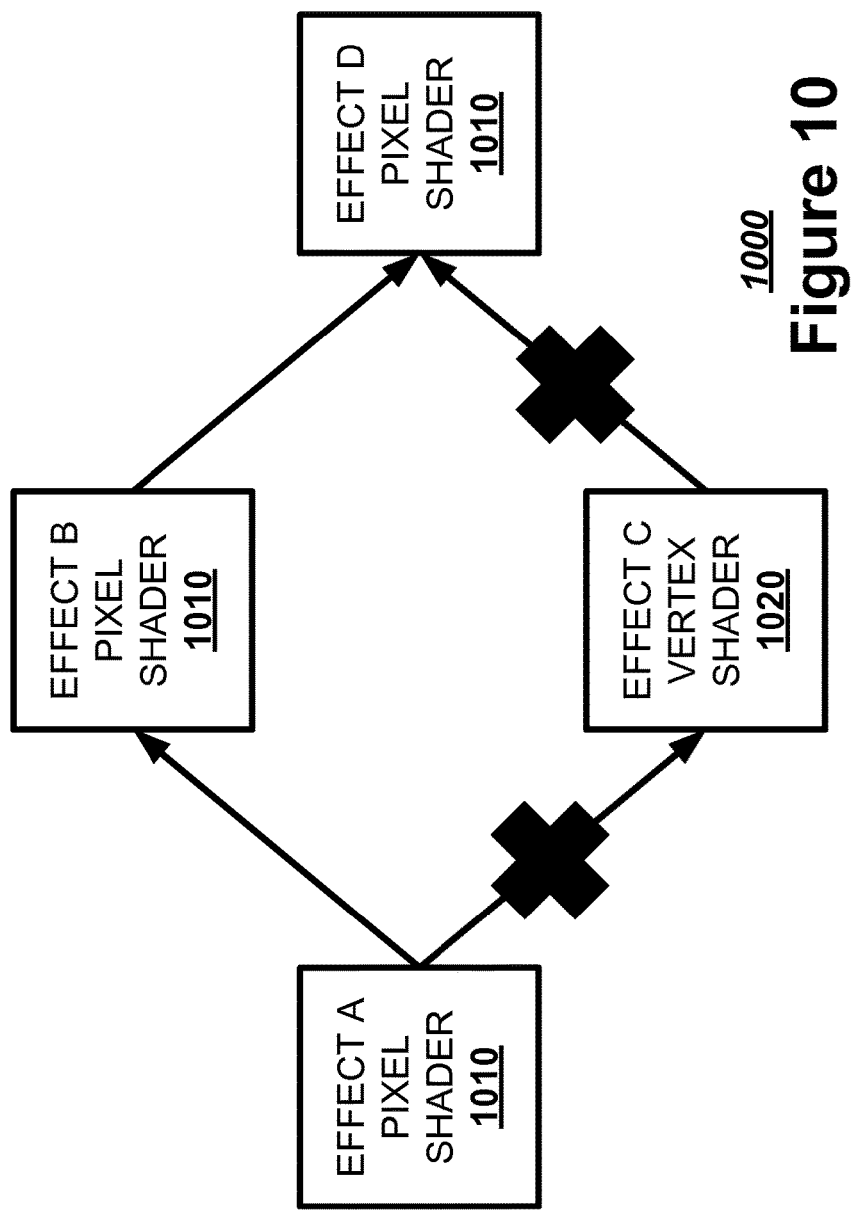

FIG. 10 illustrates, in a block diagram, an exemplary diverse module layout.

Figure 11:
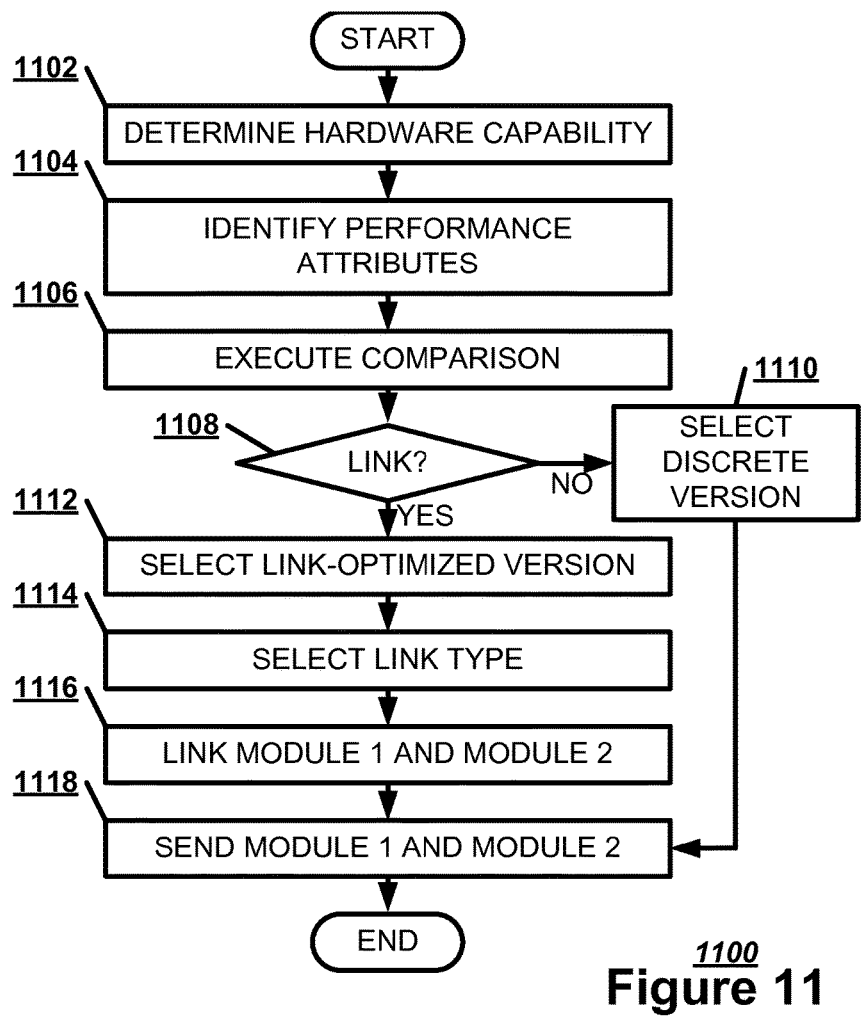

FIG. 11 illustrates, in a flowchart, an exemplary method for assembling pre-compiled graphic effect modules with a central processing unit.

Figure 12:
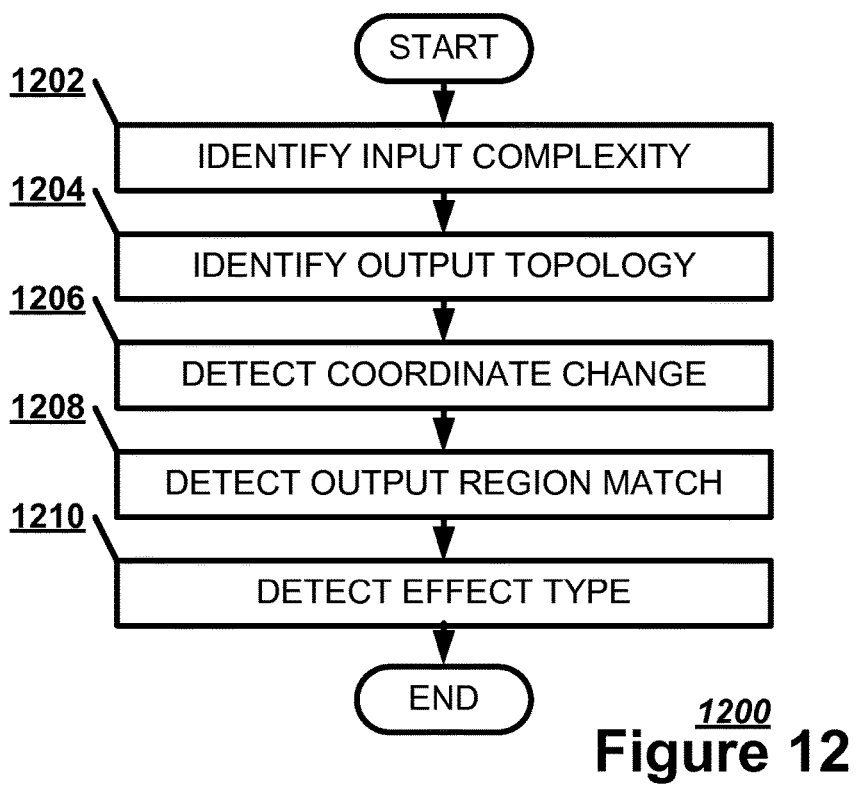

FIG. 12 illustrates, in a flowchart, an exemplary method for determining the link aptitude of a pre-compiled graphic effect module.

Figure 13:
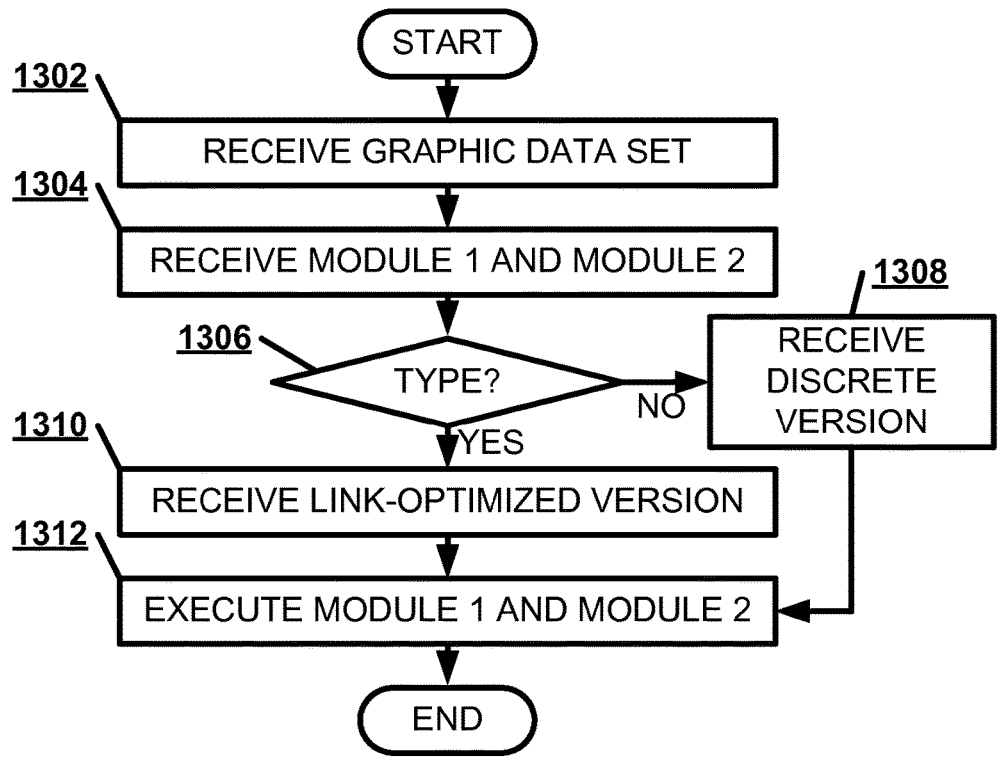

FIG. 13 illustrates, in a flowchart, an exemplary method for executing pre-compiled graphic effect modules with a graphics processing unit.

DETAILED DESCRIPTION

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, or a graphics rendering subsystem for a computing device.

A graphics processing unit may work with a central processing unit to process a graphic data set for display to a user. A graphic data set may be any type of digital graphic data, such as a digital image, a bitmap, a digital video, or other visual data. While processing the graphic data set, the graphics processing unit may apply one or more graphic effects to the image. The graphics processing unit may implement a graphic effect module to create the graphic effect. A graphic effect module is an application module that specializes in performing the graphic effect, such as a shader. A shader is a specialized rendering application that may be used to execute a graphic effect in a graphics processing unit or a conventional central processing unit.

The central processing unit may link graphic effect modules to minimize operation time, power consumption, and memory consumption by the graphics processing unit during rendering. By linking the graphic effect modules, the graphics processing unit may perform the graphic effect transforms on the graphic data set in a single rendering pass. The central processing unit may consider input complexity, output topology, the coordinate space of the output, output region, effect type, hardware capability, image fidelity, image precision, or other performance attributes in determining whether to link two graphic effect modules. A performance attribute is a characteristic of a graphic effect module used by the central processing unit to determine suitability for linking. The graphic effect modules may be compiled prior to loading into the renderer layer of the graphics processing unit. The central processing unit may link the graphic effect modules at render-time.

If the central processing unit elects to link the two graphic effect modules, the graphics processing unit may select a link-optimized version of the graphic effect modules. A link-optimized version may be a simplified function version performing the tasks of the graphic effect module, such as a linkable graphic effect function or a linkable shader function. If the central processing unit elects to not link the two graphic effect modules, the central processing unit may select a discrete operation version of the graphic effect modules. A discrete operation version may be a full transform version that may exist as an independent entity, such as a full graphic effect module or a full shader.

Thus, in one example, a graphics rendering subsystem may selectively link a set of graphic effect modules, such as shaders, to minimize execution time, memory consumption, or power consumed while increasing accuracy and central processing unit efficiency. The central processing unit may execute a comparison of a performance attribute of a first pre-compiled graphic effect module with a linking criteria. The central processing unit may link the first pre-compiled graphic effect module and a second pre-compiled graphic effect module at render-time in response to the performance attribute satisfying the linking criteria. The graphics processing unit may execute the first pre-compiled graphic effect module and the second pre-compiled graphic effect module on a graphic data set in a single render pass.

Figure 1:
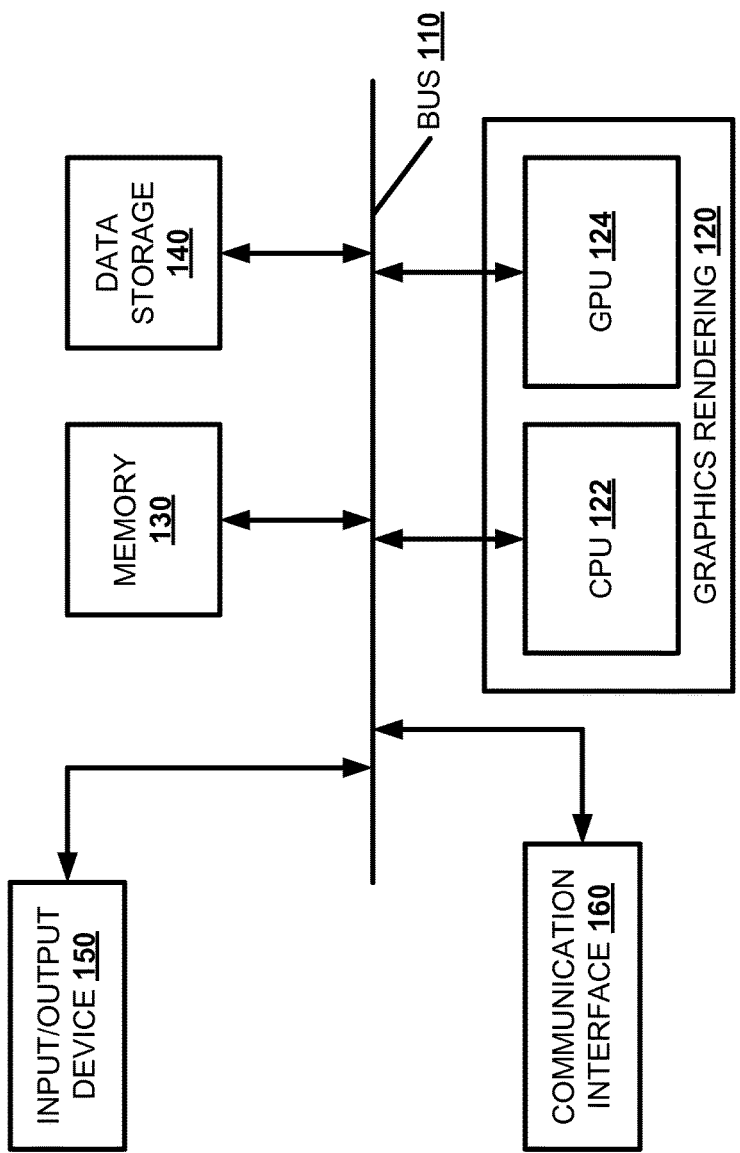
FIG. 1 illustrates, in a block diagram, an exemplary computing device.

FIG. 1 illustrates a block diagram of an exemplary computing device 100 which may process graphic data. The computing device 100 may combine one or more of hardware, software, firmware, and system-on-a-chip technology to process graphic data. The computing device 100 may include a bus 110, a graphics rendering subsystem 120 having a central processing unit 122 and a graphics processing unit 124, a memory 130, a data storage 140, an input/output device 150, and a communication interface 160. The bus 110, or other component interconnection, may permit communication among the components of the computing device 100.

The central processing unit 122 of the graphics rendering subsystem 124 may include at least one conventional processor or microprocessor that interprets and executes a set of instructions. The central processing unit 122 may be configured to execute a comparison of a performance attribute of a first pre-compiled graphic effect module with a linking criteria. The central processing unit 122 may be configured to link the first pre-compiled graphic effect module and a second pre-compiled graphic effect module. The graphics processing unit 124 of the graphics rendering subsystem may include at least one processor or microprocessor specialized for processing graphic data. The graphics processing unit 124 may be configured to execute the first pre-compiled graphic effect module and the second pre-compiled graphic effect module on a graphic data set in a single render pass.

The memory 130 may be a random access memory (RAM) or another type of dynamic data storage that stores information and instructions for execution by the central processing unit 122. The memory 130 may also store temporary variables or other intermediate information used during execution of instructions by the central processing unit 122. The data storage 140 may include a conventional read only memory (ROM) device or another type of static data storage that stores static information and instructions for the central processing unit 122. The data storage 140 may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored on computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 140 may store a set of instructions detailing a method that when executed by one or more processors cause the one or more processors to perform the method. The data storage 140 also may be a database or a database interface for storing pre-compiled graphic effect modules, such as shaders.

The input/output device 150 may include one or more conventional mechanisms that permit a user to input information to the computing device 100, such as a keyboard, a mouse, a voice recognition device, a microphone, a headset, a gesture recognition device, a touch screen, etc. The input/output device 150 may include one or more conventional mechanisms that output information to the user, including a display, a printer, one or more speakers, a headset, or a medium, such as a memory, or a magnetic or optical disk and a corresponding disk drive. The communication interface 160 may include any transceiver-like mechanism that enables computing device 100 to communicate with other devices or networks. The communication interface 160 may include a network interface or a transceiver interface. The communication interface 160 may be a wireless, wired, or optical interface.

The computing device 100 may perform such functions in response to central processing unit 122 executing sequences of instructions contained in a computer-readable medium, such as, for example, the memory 130, a magnetic disk, or an optical disk. Such instructions may be read into the memory 130 from another computer-readable medium, such as the data storage 140, or from a separate device via the communication interface 160.

Figure 2:
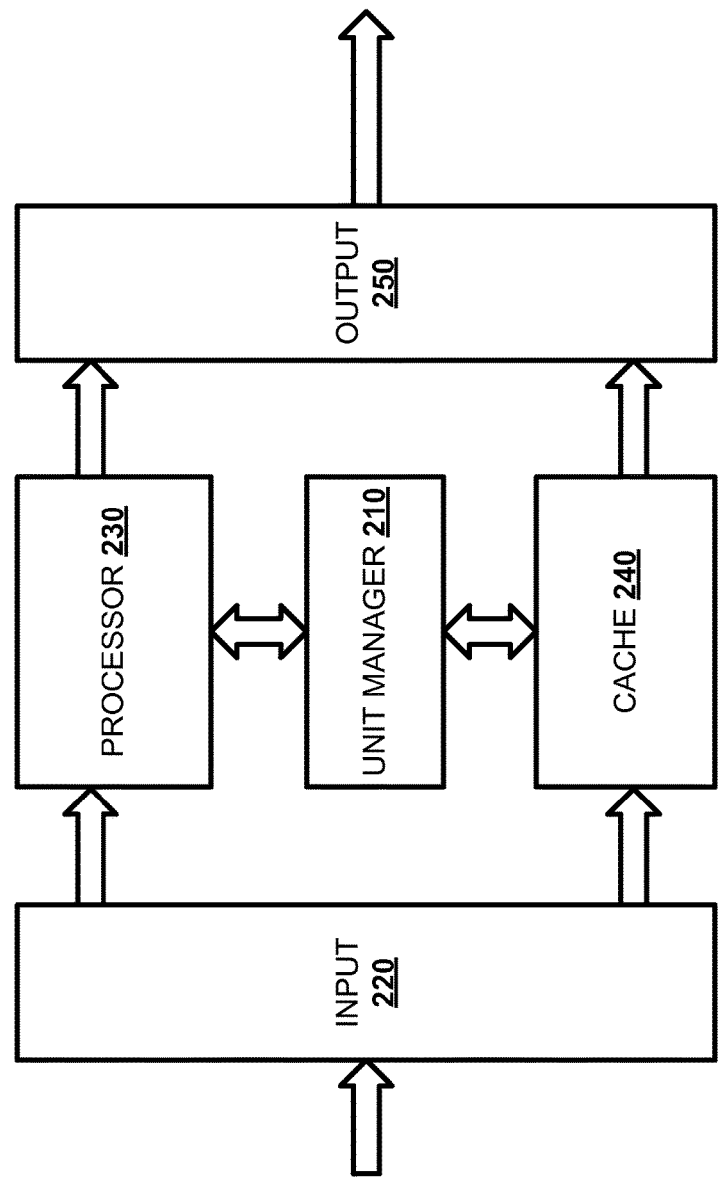
FIG. 2 illustrates, in a block diagram, an exemplary graphics processing unit.

FIG. 2 illustrates, in a block diagram, an exemplary processing unit 200. The processing unit 200 may be configured to act as a central processing unit 122 or a graphics processing unit 124. The processing unit 200 may have a unit manager 210 to direct operations by the processing unit 200. The processing unit 120 may have a data input 220 for receiving a graphic data set to process for display by the computing device 100. A graphic data set may be a digital image, a graphic, a video, or other digital image.

The processing unit 120 may have one or more graphics processors 230 to process the graphic data set. The graphics processor 230 may implement one or more graphics effects modules, such as a shader, to execute the processing of the graphic data set. A shader is a rendering application that prepares the graphic data set for display to the user. A shader may be specialized to handle multiple tasks for preparing graphics data for presentation to a user. For example, the graphics processor 230 may implement a vertex shader, a geometry shader, a pixel shader, or a tessellation shader. A vertex shader may transform the three dimensional position of each vertex of a geometry into a two dimensional coordinate presented on a display screen. A vertex is the intersection of two or more edges of the geometry. A geometry shader may generate primitive geometries, such as points, lines, and triangles, based on input primitives. A pixel shader may compute the color and other attributes of each pixel. A tessellation shader may divide a complex geometry into a set of primitive geometries. The graphics effects modules may be compiled before being received by the graphics processing unit 124. The graphics effects modules may be optimized to be linked with other graphics effects modules at render-time for more efficient operation. Alternately, the graphics effects modules may be optimized to operate discretely, without interacting with other graphics effects modules.

The processing unit 120 may have a cache 240 or other memory or storage device for storing the graphic data set and the pre-compiled graphics effects modules. The processing unit 120 also may have a data output 250 to provide processed data.

Figure 3:
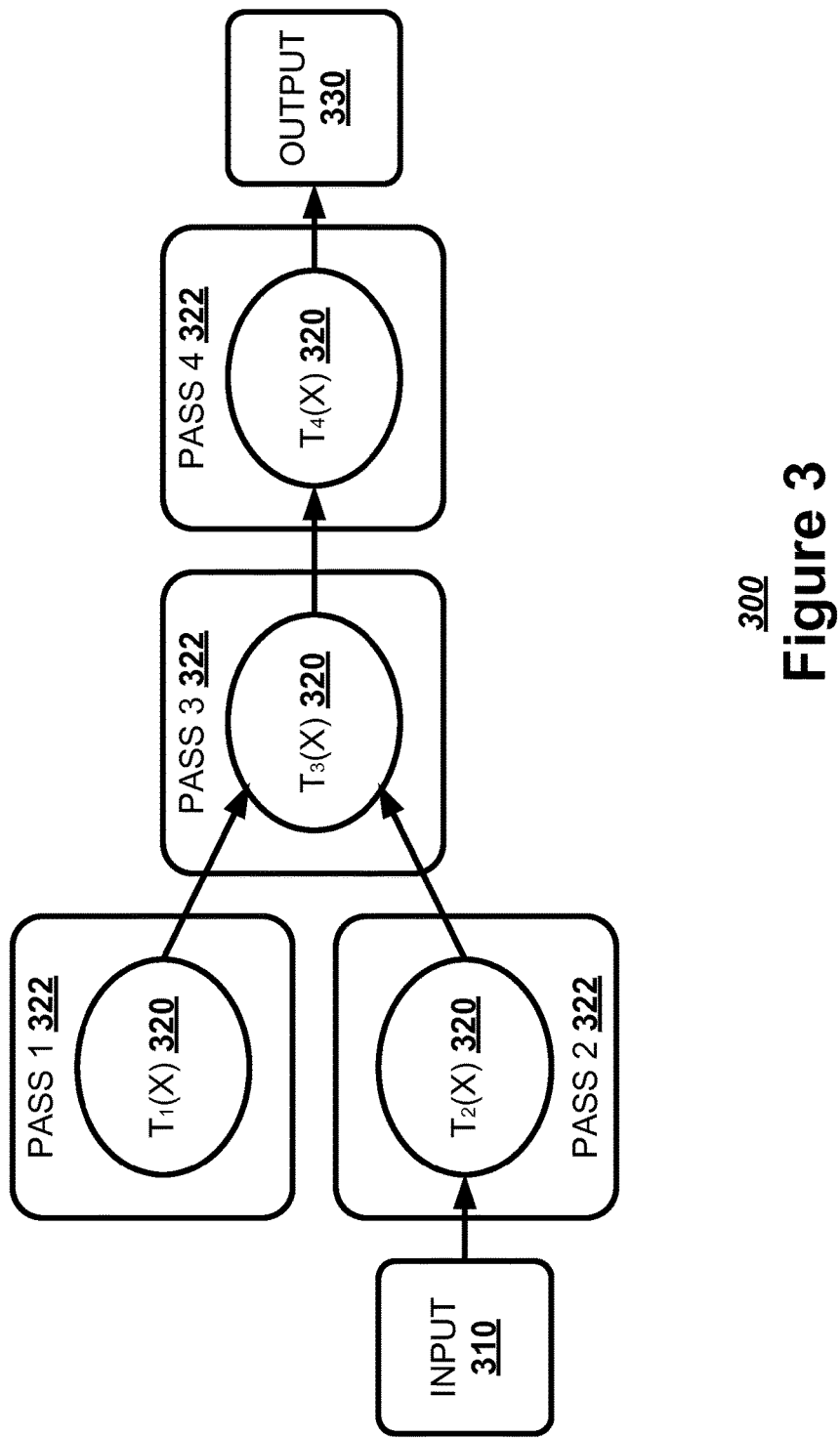
FIG. 3 illustrates, in a block diagram, an exemplary discrete transformation series.

The graphics processing unit 124 may execute a set of graphic effects on a graphic data set. The graphics processing unit 124 may execute the graphics effects as a series of discrete transforms. FIG. 3 illustrates, in a block diagram, an exemplary discrete transformation series 300. The graphics processing unit 124 may receive an input graphic data set 310 for processing. The graphics processing unit 124 may execute a first transform 320 with a first pre-compiled graphics effects module in a first rendering pass 322. The graphics processing unit 124 also may execute a second transform 320 on the input graphic data set 310 with a second pre-compiled graphics effects module in a second rendering pass 322. The first transform 322 and the second transform 322 provide input into a third transform 322. The graphics processing unit 124 then may execute the third transform 320 with a third pre-compiled graphics effects module in a third rendering pass 322 to input into a fourth transform 320. The graphics processing unit 124 then may execute the fourth transform 320 with a fourth pre-compiled graphics effects module in a fourth rendering pass 322 producing an output graphic data set 330.

Figure 4:
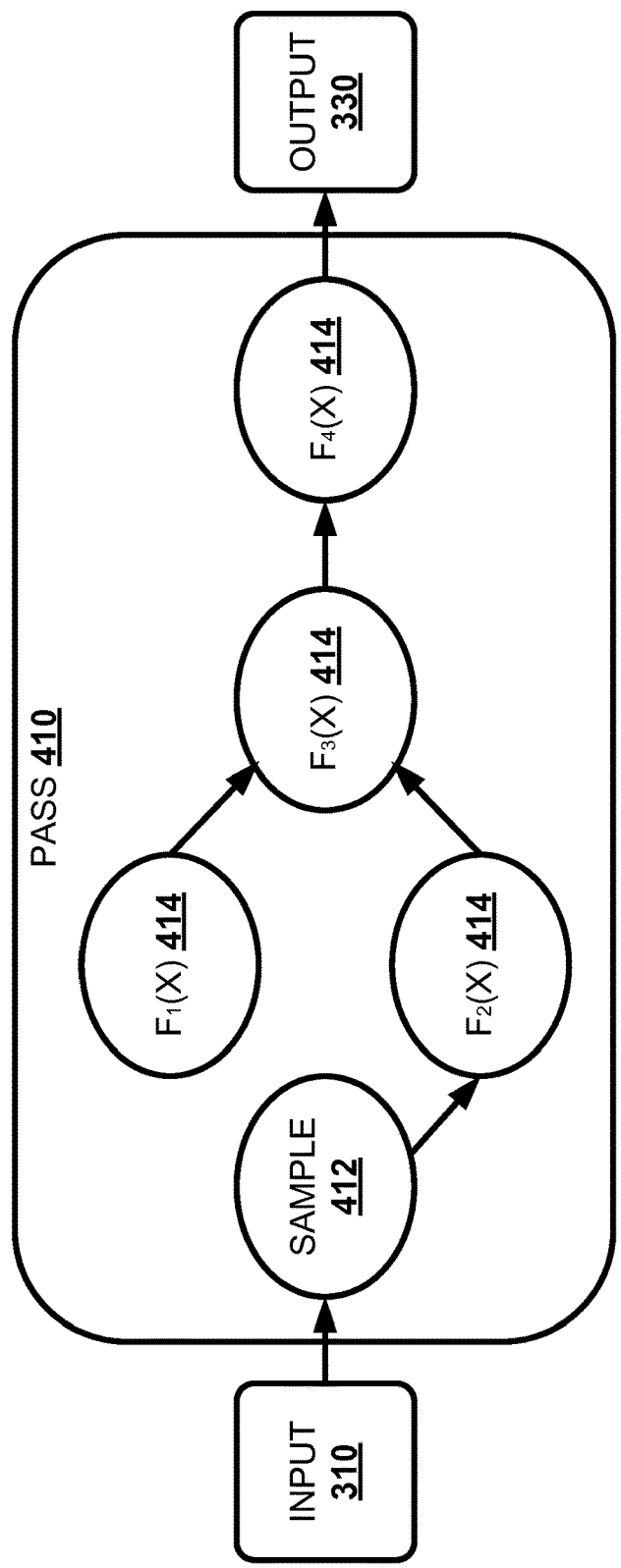
FIG. 4 illustrates, in a block diagram, an exemplary linked transformation series.

By linking the pre-compiled graphics effects modules, the graphics processing unit may greatly increase efficiency. Each graphics effects module may be configured as a compiled export function version of the original graphics effect transform. FIG. 4 illustrates, in a block diagram, an exemplary linked effect series. The graphics processing unit 124 may receive an input graphic data set 310 for processing. The graphics processing unit 124 may execute a single rendering pass 410 on the input graphic data set 310. The graphics processing unit 124 may apply a sampling function 412 to the input graphic data set 310. The graphics processing unit 124 may execute a first function 414 with a first pre-compiled graphics effects module. The graphics processing unit 124 also may execute a second function 414 with a second pre-compiled graphics effects module on the output of the sampling function 412. The first function 414 and the second function 414 may provide input into a third function 414. The graphics processing unit 124 then may execute the third function 414 with a third pre-compiled graphics effects module to input into a fourth function 414. The graphics processing unit 124 then may execute the fourth function 414 with a fourth pre-compiled graphics effects module producing an output graphic data set 330.

Figure 5:
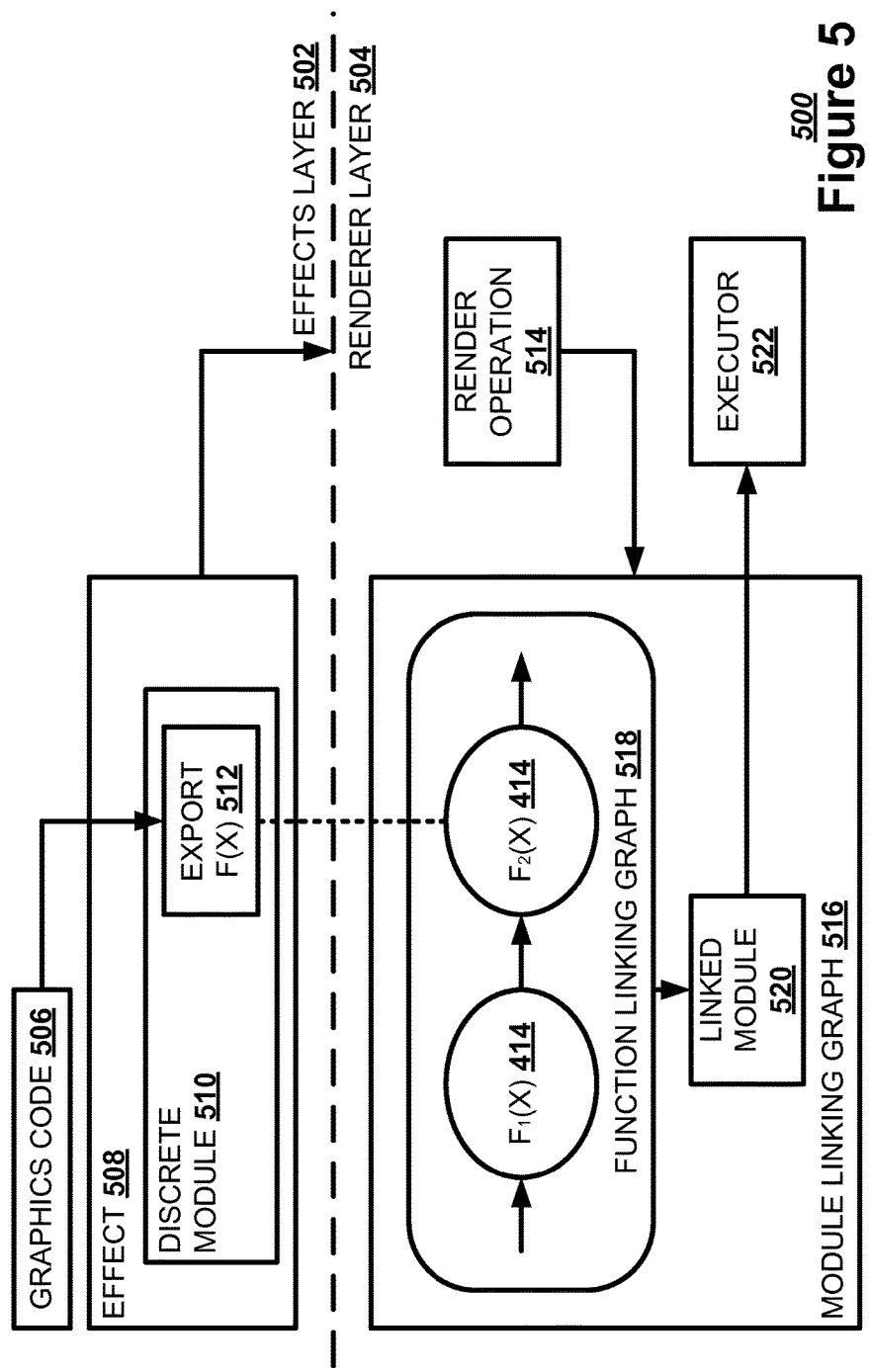
FIG. 5 illustrates, in a block diagram, an exemplary linking operation architecture.

FIG. 5 illustrates, in a block diagram, an exemplary linking operation architecture 500. A linking operation architecture 500 may have an effects layer 502 and a renderer layer 504. In the effects layer 502, the graphic effect modules may be modified to produce both a discrete graphic effect module and a linkable export function version of each graphic effect module at compile time. In the renderer layer 504, the graphics processing unit 124 may receive the compiled graphic effect module as either the discrete graphic effect module or the export function version, as selected by the central processing unit 122.

The effects layer 502 may compile a set of graphics code 506, such as a High Level Shader Language® code, to create a graphics effect 508. The effects layer 502 may embody the graphic effect 508 by generating a full graphic effect module 510 having an export graphic effect function 512 from the graphics code set 506. A load function may load the graphic effect 508, embodied as the full graphic effect module 510 with the export graphic effect function 512, into the renderer layer 504. Alternately, the central processing unit, such as the central processing unit 122, may implement a graphics effect 508. The central processing unit may use specialized vector instructions to implement the graphics effect 508.

The renderer layer 504 may execute a render operation 514. The render operation 514 may consult a module linking graph 516 to link a set of graphic effect modules 510. The module linking graph 516 may use a function linking graph 518 to link a series of graphic effect functions 414 to create a linked graphic effect module 520. The module linking graph 516 then may export the linked graphic effect module 520 to a render operation executor 522 for execution.

A graphics effect 508 may incorporate multiple functions 414. The linking may be intra-effect or inter-effect. FIG. 6a illustrates, in a block diagram, an exemplary greedy function linking 600. A greedy function linking 600 may link a function 414 regardless of whether the function is a part of the same effect 508. The greedy function linking 600 may use a cross-effect link 610 to link a function 414 with a function from a separate graphic effect 508 over a function 414 in the same graphic effect 508. FIG. 6b illustrates, in a block diagram, an exemplary priority function linking 650. A priority function linking 650 may prioritize intra-effect links. The priority function linking 650 may use a priority link 660 to prioritize linking two functions 414 in the same graphic effect 508.

Not every situation may be improved by linking the graphic effect modules. The central processing unit 122 may implement logic to determine whether a scenario indicates the graphic effect modules are to be linked or whether the graphic effect modules are to act discretely. The central processing unit 122 may select between different versions of the graphic effect module. The central processing unit 122 may take a number of factors into account when determining whether to use a link-optimized version or a discrete operation version of the pre-compiled graphic effect module. The central processing unit 122 may compare a performance attribute of a pre-compiled graphic effect module with a linking criteria to determine whether linking is advantageous. For example, the capabilities of the graphics processing unit 124 may be a performance attribute. The graphics processing unit 124 may have a limit on the number of instructions that may be performed in a single rendering pass without incurring a penalty.

In a further example, the central processing unit 122 may identify an input complexity for the graphic effect module as a performance attribute. FIG. 7a illustrates, in a block diagram, an exemplary simple sampling pattern 700. In a simple sampling pattern 700, the value of an input pixel 710 may determine the value of the corresponding output pixel 720 at the same position. An example of a simple sampling effect may be grayscale 730, which converts a color pixel to a shade of gray. FIG. 7b illustrates, in a block diagram, an exemplary complex sampling pattern 750. In a complex sampling pattern 750, the value of input pixels 710 at multiple locations may determine the value of the corresponding output pixel 720. An example of a complex sampling effect may be blurring 760, which causes a pixel to blur with neighboring pixels. A simple sampling effect may be a good candidate for linking, with a complex sampling effect being a less effective candidate. Similarly, a graphic effect that alters the coordinate space when sampling may not be an effective candidate for linking. One example of a graphic effect that alters a sampling coordinate space may be an effect that translates the input graphic data set. Thus, a linking criteria may weigh in favor of a simple sampling effect over a complex sampling effect.

The topology of the application of the graphic effect modules may be a performance attribute. FIG. 8 illustrates, in a block diagram, an exemplary graph topology 800. Graphic effect module A 810 may export a graphic data set to both graphic effect module B 810 and graphic effect module C 810. Graphic effect module B 810 and graphic effect module C 810 both may export the graphic data set to graphic effect module D 810. Graphic effect module B 810 and graphic effect module C 810 both may be linked to graphic effect module D 810 in a manner that increases operation efficiency. However, the output topology of graphic effect module A 810 may cause linking to be inefficient. The graphic effect module A 810 may run multiple times to produce the outputs for the other graphic effect modules 810 if linked. Thus, a linking criteria may weigh in favor of providing an output to a single graphic effect modules over multiple other graphic effect modules.

While two graphic effect modules may be linked advantageously to a third graphic effect module that receives inputs from both, some factors still may weigh against linking. The effect region may be a performance attribute. FIG. 9a illustrates, in a block diagram, an exemplary offset output mapping 900. Graphic effect module B 910, a flood blue function, may export to the input space 920 of graphic effect D module 910 in the effect B region 922. Graphic effect module C 910, a flood green function, may export to the input space 920 of graphic effect D module 910 in the effect C region 922. The effect B region 922 may not intersect at any point with the effect C region. The lack of an intersection may render any linking of the graphic effect B module 910 and the graphic effect C module 910 with the graphic effect D module 910 either not advantageous or disadvantageous in some cases.

Similarly, FIG. 9b illustrates, in a block diagram, an exemplary offset output mapping 950. Graphic effect module B 910 may export to the input space 920 of graphic effect D module 910 in the effect B region 922. Graphic effect module C 910 may export to the input space 920 of graphic effect D module 910 in the effect C region 922. The effect B region 922 may have a small region of incomplete overlap 960 with the effect C region. This incomplete overlap 960 may render any linking of the graphic effect B module 910 and the graphic effect C module 910 with the graphic effect D module 910 either not advantageous or disadvantageous in some cases. Thus, a linking criteria may weigh in favor of overlapping effect regions over discrete effect regions.

Further, linking criteria may consider whether two graphic effect modules have different effect types, such as a pixel shader and a vertex shader. A shader type for a graphic effect module may be a performance attribute. FIG. 10 illustrates, in a block diagram, an exemplary diverse module layout 1000. Pixel shader A 1010 may export a graphic data set to both pixel shader B 1010 and vertex shader C 1010. Pixel shader B 1010 and vertex shader C 1010 both may export the graphic data set to pixel shader D 1010. Linking a vertex shader, such as vertex shader C 1010, with pixel shaders, such as pixel shader A 1010 and pixel shader D 1010, may be either not advantageous or disadvantageous. However, if a graphic effect module acts as both a pixel shader and a vertex shader, linking may be advantageous. Thus, a linking criteria may weigh in favor of graphic effect modules of the same shader type over graphic effect modules of differing shader types.

FIG. 11 illustrates, in a flowchart, an exemplary method 1100 for assembling pre-compiled graphic effect modules with a central processing unit. A rendering layer of a central processing unit, such as the central processing unit 122, processing a graphic data set may determine a hardware capability of the graphics processing unit (Block 1102). The central processing unit may identify a set of performance attributes of a first pre-compiled graphic effect module and a second pre-compiled graphic effect module (Block 1104). The central processing unit may execute a comparison of a performance attribute of a first pre-compiled graphic effect module with a linking criteria (Block 1106). If linking is not selected as being advantageous according to a set of linking criteria (Block 1108), the graphics processing unit may select a discrete operation version of the first pre-compiled graphic effect module (Block 1110). If, instead, linking is selected as being advantageous according to a set of linking criteria (Block 1108), the central processing unit may select a link-optimized version of the first pre-compiled graphic effect module (Block 1112). The central processing unit may select at least one of a cross-effect link type and a priority link type (Block 1114). The central processing unit may link the first pre-compiled graphic effect module and the second pre-compiled graphic effect module at render-time in response to the performance attribute satisfying the linking criteria (Block 1116). The central processing unit may send the first pre-compiled graphic effect module and the second pre-compiled graphic effect module to a graphics processing unit (Block 1118).

FIG. 12 illustrates, in a flowchart, an exemplary method 1200 for identifying a set of performance attributes of a pre-compiled graphic effect module. A central processing unit, such as the central processing unit 122, may identify an input complexity of the second pre-compiled graphic effect module (1202). The central processing unit may identify an output topology of the first pre-compiled graphic effect module (1204). The central processing unit also may detect whether the second pre-compiled graphic effect module changes a coordinate space of a sample coordinate set (1206). The central processing unit further may detect whether a first output region of the first pre-compiled graphic effect module matches a second output region of the second pre-compiled graphic effect module (1208). The central processing unit further more may detect whether a first effect type of the first pre-compiled graphic effect module matches a second effect type of the second pre-compiled graphic effect module (1210).

FIG. 13 illustrates, in a flowchart, an exemplary method 1300 for executing pre-compiled graphic effect modules with a graphics processing unit. A rendering layer of a graphics processing unit, such as the graphics processing unit 124, processing a graphic data set may receive a graphic data set (Block 1302). The graphics processing unit may receive a first pre-compiled graphic effect module and a second pre-compiled graphic effect module (Block 1304). If the graphics processing unit has not selected linking as being advantageous according to a set of linking criteria (Block 1306), the graphics processing unit may receive a discrete operation version of the first pre-compiled graphic effect module (Block 1308). If, instead, the graphics processing unit has selected linking as being advantageous according to a set of linking criteria (Block 1306), the graphics processing unit may receive a link-optimized version of the first pre-compiled graphic effect module (Block 1310). The graphics processing unit may execute the first pre-compiled graphic effect module and the second pre-compiled graphic effect module on a graphic data set in a single render pass (Block 1312).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Examples within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to carry or store desired program code means in the form of computer-executable instructions or data structures. Combinations of the above should also be included within the scope of the computer-readable storage media.

Examples may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described examples are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A machine-implemented method, comprising:
   comparing a performance attribute describing a first application module that specializes in rendering a first graphic effect compiled prior to loading into a renderer layer to act as a first pre-compiled graphic effect module with a linking criteria describing an operation performance improved by linking, the performance attribute corresponding to at least one of:
   an input complexity of the second pre-compiled graphic effect module,
   an output topology of the first pre-compiled graphic effect module,
   an effect region of one or both of the first pre-compiled graphic effect module or the second pre-compiled graphic effect module, or
   a shader type of one or both of the first pre-compiled graphic effect module or the second pre-compiled graphic effect module;
   selecting, based on the performance attribute satisfying the linking criteria, at least one of a cross-effect link type that prioritizes inter-effect linking of at least two functions each from separate graphic effects over two functions from a same graphic effect or a priority link type that prioritizes intra-effect linking of at least two functions from the same graphic effect;
   linking, using at least one of the cross effect link type or the priority link type, the first pre-compiled graphic effect module and a second application module that specializes in rendering a second graphic effect compiled prior to loading into the renderer layer to act as a second pre-compiled graphic effect module at render-time in response to the performance attribute satisfying the linking criteria; and
   sending the first pre-compiled graphic effect module and a second pre-compiled graphic effect module to a graphics processing unit to process in the renderer layer a graphic data set in a single render pass.

2. The method of claim 1, farther comprising:
   selecting a link-optimized version of the first pre-compiled graphic effect module when linking is selected.

3. The method of claim 1, further comprising:
   selecting a discrete operation version of the first pre-compiled graphic effect module when linking is not selected.

4. The method of claim 1, further comprising:
   identifying the input complexity of the second pre-compiled graphic effect module.

5. The method of claim 1, farther comprising:
   identifying the output topology of the first pre-compiled graphic effect module.

6. The method of claim 1, further comprising:
   detecting whether the second pre-compiled graphic effect module changes a coordinate space of a sample coordinate set.

7. The method of claim 1, further comprising:
   determining a hardware capability of the graphics processing unit processing the graphic data set.

8. The method of claim 1, further comprising:
   detecting whether a first output region of the first pre-compiled graphic effect module matches a second output region of the second pre-compiled graphic effect module.

9. The method of claim 1, further comprising:
   detecting whether a first effect type of the first pre-compiled graphic effect module matches a second effect type of the second pre-compiled graphic effect module.

10. A tangible machine-readable medium having a set of instructions detailing a method stored thereon that when executed by a processing system having one or more processors cause the processing system to perform:
    comparing a performance attribute describing a first application module that specializes in rendering a first graphic effect compiled prior to loading into a renderer layer to act as a first pre-compiled graphic effect module with a linking criteria describing an operation performance improved by linking, the performance attribute corresponding to at least one of:
    an input complexity of the second pre-compiled graphic effect module,
    an output topology of the first pre-compiled graphic effect module,
    an effect region of one or ban of the first pre-compiled graphic effect module or the second pre-compiled graphic effect module; or a shader type of one or both of the first pre-compiled graphic effect module or the second pre-compiled graphic effect module;

selecting, based on the performance attribute satisfying the linking criteria, at least one of a cross-effect link type that prioritizes inter-effect linking of at least two functions each from separate graphic effects over two functions from a same graphic effect or a priority link type that prioritizes intra-effect linking of at least two functions from the same graphic effect;

linking, using at least one of the cross-effect link type or the priority link type, the first pre-compiled graphic effect module and a second application module that specializes in rendering a second graphic effect compiled prior to loading into the renderer layer to act as a second pre-compiled graphic effect module at render-time in response to the performance attribute satisfying the linking criteria; and executing in the renderer layer the first precompiled graphic effect module and the second pre-compiled graphic effect module on a graphic data set in a single render pass.

11. The tangible machine-readable medium of claim 10, wherein the method further comprises:

selecting between a link-optimized version and a discrete operation version of the first pre-compiled graphic effect module.

12. The tangible machine-readable medium of claim 10, wherein the method further comprises:

identifying the input complexity of the second pre-compiled graphic effect module.

13. The tangible machine-readable medium of claim 10, wherein the method further comprises:

identifying the Output topology of the first pre-compiled graphic effect module.

14. The tangible machine-readable medium of claim 10, wherein the method further comprises:

detecting whether the second pre-compiled graphic effect module changes a coordinate space of a sample coordinate set.

15. The tangible machine-readable medium of claim 10, wherein the method further comprises:

detecting whether a first output region of the first pre-compiled graphic effect module matches a second output region of the second pre-compiled graphic effect module.

16. The tangible machine-readable medium of claim 10, wherein the method further comprises:

detecting whether a first effect type of the first pre-compiled graphic effect module matches a second effect type of the second pre-compiled graphic effect module.

17. A graphics rendering subsystem, comprising:

memory configured to store a first application module that specializes in rendering a first graphic effect to act as a first graphic effect module and a second application module that specializes in rendering a second graphic effect compiled prior to loading into to act as a second graphic effect module both compiled prior to loading into a renderer layer, the performance attribute corresponding to at least one of:

an input complexity of the second pre-compiled graphic effect module, an output topology of the first pre-compiled graphic effect module, an effect region of one or both of the first pre-compiled graphic effect module or the second pre-compiled graphic effect module, or a shader type of one or both of the first pre-compiled graphic effect module or the second pre-compiled graphic effect module;

a central processing unit configured to:

select, based on the performance attribute satisfying the linking criteria, at least one of a cross-effect link type that prioritizes inter-effect linking of at least two functions each from separate graphic effects over two functions froth a same graphic effect or a priority link type that prioritizes intra-effect linking of at least two functions from the same graphic effect;

compare a performance attribute describing a first graphic effect module with a linking criteria describing an operation performance improved by linking; and link, using at least one of the cross-effect link type or the priority link type, the first graphic effect module and a second graphic effect module in response to the performance attribute satisfying the linking criteria; and a graphics processing unit configured to execute in a renderer layer the first graphic effect module and the second graphic effect module on a graphic data set in a single render pass.

18. The graphics rendering subsystem of claim 17, wherein the graphics processor selects between a link-optimized version and a discrete operation version of the first graphic effect module.

* * * * *

UNITED STATES PATENT AND TRADEMARK OFFICE
CERTIFICATE OF CORRECTION

PATENT NO. : 10,068,370 B2
APPLICATION NO. : 14/485323
DATED : September 4, 2018
INVENTOR(S) : Luke Olsen et al.

It is certified that error appears in the above-identified patent and that said Letters Patent is hereby corrected as shown below:

In the Claims

Claim 1, Column 9, Line 56 reads:
an input complexity of the second pre-compiled
Should read:
an input complexity of a second pre-compiled Claim 10, Column 10, Line 61 reads:
an input complexity of the second pre-compiled
Should read:
an input complexity of a second pre-compiled Claim 17, Column 12, Line 14 reads:
an input complexity of the second pre-compiled
Should read:
an input complexity of the second Claim 17, Column 12, Line 16 reads:
an output topology of the first pre-compiled graphic
Should read:
an output topology of the first graphic Claim 17, Column 12, Line 18 reads:
an effect region of one or both of the first pre-compiled
Should read:
an effect region of one or both of the first Claim 17, Column 12, Line 19 reads:
graphic effect module or the second pre-compiled Signed and Sealed this
Sixth Day of November, 2018

Andrei Iancu
*Director of the United States Patent and Trademark Office*

CERTIFICATE OF CORRECTION (continued)
U.S. Pat. No. 10,068,370 B2

Should read:
graphic effect module or the second

Claim 17, Column 12, Line 21 reads:
a shader type of one or both of the first pre-compiled
Should read:
a shader type of one or both of the first Claim 17, Column 12, Line 22 reads:
graphic effect module or the second pre-compiled
Should read:
graphic effect module or the second